(12) United States Patent
Hibi et al.

(10) Patent No.: US 7,396,003 B2
(45) Date of Patent: Jul. 8, 2008

(54) FLUID-FILLED VIBRATION-DAMPING DEVICE

(75) Inventors: Satoru Hibi, Ichinomiya (JP); Chiyaki Inoue, Komaki (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 886 days.

(21) Appl. No.: 10/406,340

(22) Filed: Apr. 2, 2003

(65) Prior Publication Data

US 2003/0205856 A1 Nov. 6, 2003

(30) Foreign Application Priority Data

Apr. 23, 2002 (JP) .............................. 2002-121256

(51) Int. Cl.
  *F16F 5/00* (2006.01)
(52) U.S. Cl. ................................ 267/140.13; 267/141.6
(58) Field of Classification Search ............ 267/140.11, 267/140.13, 141.1, 141.6, 136, 292
  See application file for complete search history.

(56) References Cited

U.S. PATENT DOCUMENTS

| 4,568,069 | A | * | 2/1986 | Poupard | ................. | 267/140.13 |
| 4,907,786 | A | * | 3/1990 | Okazaki et al. | ........ | 267/140.13 |
| 5,630,573 | A | | 5/1997 | Suzuki et al. | | |
| 6,158,724 | A | * | 12/2000 | Takashima et al. | ..... | 267/140.13 |
| 6,170,811 | B1 | | 1/2001 | Yotani et al. | | |
| 6,357,731 | B1 | * | 3/2002 | Tanahashi | ................. | 267/140.4 |
| 6,378,850 | B1 | * | 4/2002 | Shimizu | ................. | 267/140.13 |
| 2001/0004141 | A1 | * | 6/2001 | Shimoda et al. | ........ | 267/140.13 |
| 2002/0036370 | A1 | * | 3/2002 | Takaoka et al. | ........ | 267/140.11 |
| 2002/0140144 | A1 | * | 10/2002 | Hibi et al. | ............... | 267/140.13 |
| 2003/0075848 | A1 | * | 4/2003 | Okanaka et al. | ........ | 267/140.13 |
| 2003/0098536 | A1 | * | 5/2003 | Hasegawa | ............... | 267/140.13 |
| 2003/0141640 | A1 | * | 7/2003 | Kato | ...................... | 267/140.11 |
| 2003/0214086 | A1 | * | 11/2003 | Akasa | .................... | 267/140.13 |

FOREIGN PATENT DOCUMENTS

EP        0930447 A2        7/1999

* cited by examiner

*Primary Examiner*—Robert A. Siconolfi
(74) *Attorney, Agent, or Firm*—Beyer Law Group LLP

(57) ABSTRACT

A fluid-filled vibration-damping device includes an elastic body elastically connects a first mounting member and a cylindrical second mounting member bonded to opposite side thereof; a diaphragm supported by the second mounting member so that the diaphragm cooperates with the elastic body to define therebetween a fluid chamber; and a partition member supported by the second mounting member so that the partition member divides the fluid chamber into a primary fluid chamber and an auxiliary fluid chamber which are held in communication through an orifice passage defined by an orifice-defining member having a movable rubber plate disposed in its central hole. The surface of the orifice-defining member is coated at a primary-fluid-chamber-defining area by a coating rubber layer, thereby minimizing noises caused by bubbles in the fluid chamber.

6 Claims, 4 Drawing Sheets

FLUID-FILLED VIBRATION-DAMPING DEVICE

INCORPORATED BY REFERENCE

The disclosure of Japanese Patent Application No. 2002-121256 filed on Apr. 23, 2003 including the specification, drawings and abstract is incorporated herein by reference in its entirety.

BACKGROUND OF THE INVENTION

1. Field of the Invention

The present invention relates to a fluid-filled vibration damping device suitably applicable to engine mounts, body mounts or other mounts for use in automotive vehicles, for example.

2. Description of the Related Art

In automotive vehicles each having an engine as a vibrational source, an engine mount has been used for supporting the engine on a body frame of the vehicle in a vibration isolating fashion. FIG. 8 shows an example of such an engine mount in the form of a fluid-filled vibration-damping device.

The known fluid-filled vibration damping device includes: a first mounting member 101 of shaft configuration; a rubber elastic body 102 bonded at one end to the first mounting member and having a recess 123 open in the other end; a second mounting member 103 of cylindrical configuration bonded on an outer circumferential surface of the other end of the elastic body 102; a diaphragm whose peripheral portion is supported by an inner circumferential surface of the second mounting member 103 so that the diaphragm 104 cooperates with the elastic body 102 to define therebetween a fluid chamber 145 filled with a fluid "L"; and a partition member 105 whose peripheral portion is supported by the inner circumferential surface of the second mounting member 103 so that the partition member 105 divides the fluid chamber 145 into a primary fluid chamber 146 and an auxiliary fluid chamber 147. The partition member 105 consists of: a metallic orifice-defining member 151 adapted to define an orifice passage 154 for fluid communication between the primary and auxiliary fluid chambers 146, 147; and a movable rubber plate 152 disposed in a central hole formed through the orifice-defining member 151.

This fluid-filled vibration damping device is installed on the vehicle such that the first mounting member 101 is fixed to a mounting portion on one side of a body and an engine by means of a mounting bolt (not shown), and the second mounting member 103 is press-fitted into a mounting portion on the other side of the body and engine. With the fluid-filled vibration-damping device thus installed on the vehicle, the fluid chamber 146 may be located upward or downward in a direction in which a primary vibrational load is applied to the device.

The thus installed fluid-filled vibration damping device is able to absorb high frequency vibrational loads based on elastic deformation of the elastic body 102 and engine shakes or other low frequency vibrational loads based on resonance of fluid flowing through the orifice passage 154 caused by a fluid pressure variation and a volumetric change excited in the primary fluid chamber 146 and the auxiliary fluid chamber 147. This fluid pressure variation between these chambers 146 and 147 may be suitably regulated by means of the movable rubber plate 152 of the partition member 105.

During operation of the known fluid-filled vibration-damping device, the fluid L is forced to flow within the fluid chamber 145 based on the fluid-pressure variation in the fluid chamber 145. In this condition, oxygen dissolved in the fluid L is prone to be vaporized, causing generation of a multiplicity of bubbles within the fluid L. Especially in the primary fluid chamber, these bubbles are more likely to be generated, since the fluid pressure variation is made larger in the primary fluid chamber than the other part of the fluid chamber 145. Upon application of a vibrational load to the fluid-filled vibration-damping device, these bubbles are likely to be generated and burst repeatedly in the fluid L. When bursting, these bubbles generate impact that is exerted on the surface of the orifice-defining member exposed to the fluid chamber 145. As a result, the impact of the bubble bursting may be undesirably transmitted as noises to a vehicle room, possibly causing deterioration in silence in the vehicle room and driving comfort as felt by a driver or passengers.

SUMMARY OF THE INVENTION

It is therefore one object of this invention to provide a fluid-filled vibration damping device capable of minimizing noises caused by bubbles generated in a fluid chamber of the device.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration-damping device for elastically connecting two members in a vibration damping fashion, comprising: (a) a first mounting member fixable to one of the two members; (b) an elastic body bonded at one of opposite end portions thereof to the first mounting member and having a recess open in an other one of opposite end portions thereof; (c) a second mounting member of cylindrical configuration fixable to an other one of the two members and bonded on an outer circumferential surface of the other one of opposite end portions of the elastic body; (d) a diaphragm whose peripheral portion is supported by an inner circumferential surface of the second mounting member so that the diaphragm cooperates with the elastic body to define therebetween a fluid chamber filled with a fluid; (e) a partition member whose peripheral portion is supported by the inner circumferential surface of the second mounting member so that the partition member divides the fluid chamber into a primary fluid chamber and an auxiliary fluid chamber, the partition member including a metallic orifice-defining member adapted to at least partially define an orifice passage for fluid communication between the primary and auxiliary fluid chambers, and a movable rubber plate disposed in a central hole formed through the orifice-defining member; and (f) a coating rubber layer formed on a surface of the orifice-defining member at a primary-fluid-chamber-defining area.

In the fluid-filled vibration-damping device constructed according to this mode of the invention, the surface of the orifice-defining member is coated by the coating rubber layer at an area where the surface of the orifice-defining member defines the primary fluid chamber (hereinafter referred to as the "primary-fluid-chamber-defining area"), preferably at an area where the surface of the orifice-defining member defines the orifice passage (hereinafter referred to as the "orifice-passage-defining area"), as well. Accordingly, the area of the surface of the orifice-defining member exposed to the primary fluid chamber and the orifice passage remarkably reduced or minimized. Although a multiplicity of bubbles are likely to be generated and burst repeatedly within the fluid, especially in the primary fluid chamber subjected to a relatively large fluid pressure variation, when the fluid is forced to flow within the chamber due to the fluid pressure variation in the fluid chamber, the provision of the coating rubber layer makes it lower the possibility that an impact upon bursting of these bubbles is directly exerted on the surface of the orifice defining member. Therefore, a rate of occurrence of noises caused by the bursting of the bubbles is effectively reduced. Also, the elasticity of the coating rubber layer can absorb or minimize impact of bubble bursting applied on the coating rubber layer, thus minimizing an amount of noises undesirably transmitted to the outside of the mount. Thus, the fluid-filled vibration-damping device according to this mode of the invention is able to effectively avoid deterioration in silence and driving comfort of the vehicle.

That is, the fluid-filled vibration damping device according to this mode of the invention is capable of effectively preventing undesirably noises caused by the bubbles generated in the fluid within the fluid chamber, with the help of the coating rubber layer coating the surface of the orifice-defining member at the primary-fluid-chamber-defining area, preferably at the orifice-passage-defining area, as well.

According to this mode of the invention, the coating rubber layer can be easily bonded integrally with the orifice-defining member by vulcanizing a rubber material for forming the coating rubber layer in a mold cavity of a mold in which the orifice-defining member is preset. In order to prevent deformation of the orifice-defining member due to a pressure of the rubber material injected into the mold cavity, a plurality of pressing pins are formed on the surface of the mold cavity so that the orifice-defining member preset in the mold cavity is pressed or supported by the pressing pins. The mold coating rubber layer is not formed at respective locations where the plurality of pressing pins are held in contact with the flange portion of the orifice-defining member. In order to achieve an excellent noise reduction effect by means of the coating rubber layer, it is preferable to form the coating rubber layer on the surface of the orifice-defining member as wide as possible so that the orifice-defining member is hardly exposed to the primary fluid chamber and the orifice passage, except the above-described portion inevitably exposed to the primary fluid chamber and the orifice passage. The thickness of the coating rubber layer may be desirably determined. Preferably, the coating rubber layer may be formed also on yet another area of the orifice-defining member, which area is exposed to the auxiliary fluid chamber (hereinafter referred to as the "auxiliary-fluid-chamber defining area", where appropriate).

(2) A fluid-filled vibration-damping device according to the above-indicated mode (1), wherein the coating rubber layer is integrally formed with the orifice-defining member by vulcanizing a rubber material so that the coating rubber layer and the movable rubber plate are integrally connected and formed with each other.

According to this mode of the invention, the coating rubber layer and the movable rubber plate are formed on the surface of the orifice-defining member with no gap formed therebetween, surely preventing the surface of the orifice-defining member from being exposed to the primary fluid chamber, the orifice passage and/or the auxiliary fluid chamber. In addition, the coating rubber layer can be manufactured with ease and at a reduced expense.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
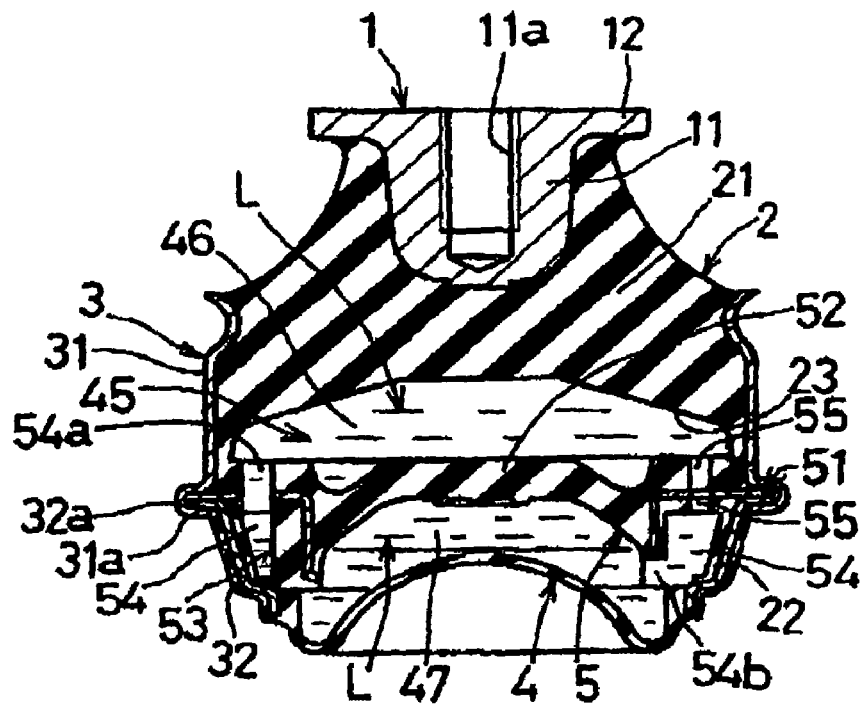
FIG. 1 is an elevational view in axial or vertical cross section of a fluid-filled vibration-damping device according to a first preferred embodiment of the invention.
Figure 2:
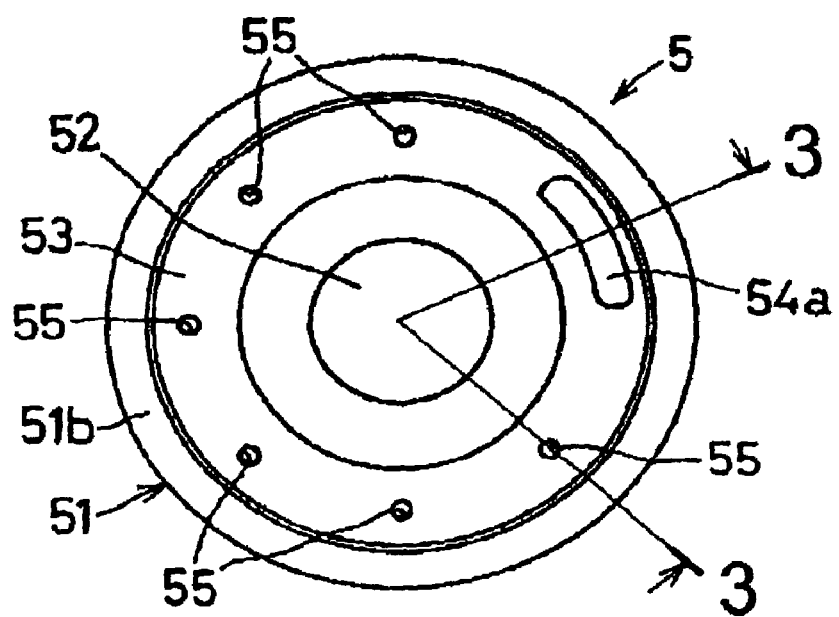
FIG. 2 is a top plane view of a partition member of the fluid-filled vibration-damping device of FIG. 1.
Figure 3:
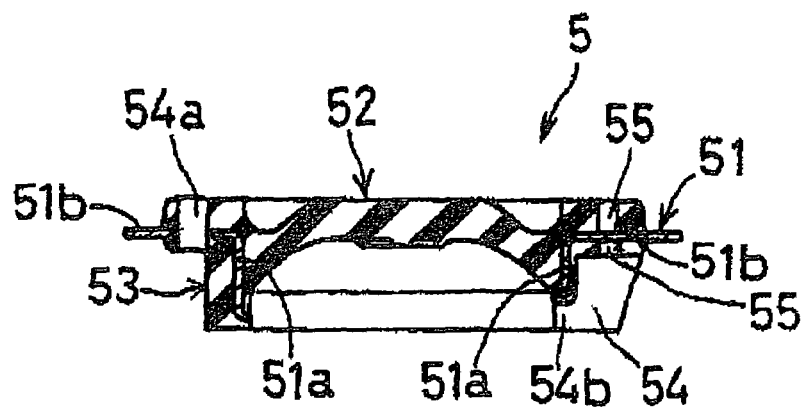
FIG. 3 is a cross sectional view taken along line 3-3 of FIG. 2.
Figure 4:
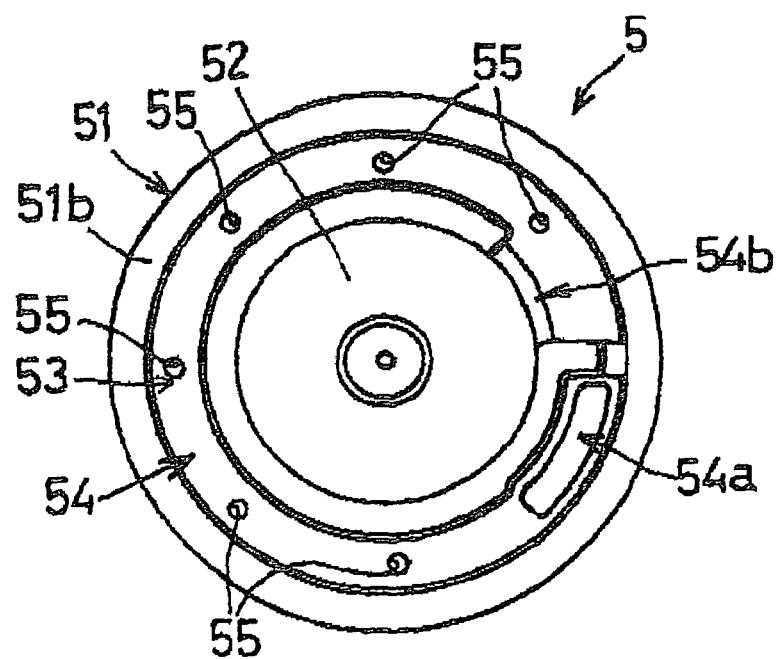
FIG. 4 is a bottom plane view of the partition member of the fluid-filled vibration-damping device of FIG. 1.

FIG. 1 is an elevational view in axial cross section of a fluid-filled vibration-damping device constructed according to a first embodiment of the present invention. FIG. 2 is a top plane view of a partition member of the fluid-filled vibration-damping device. FIG. 3 is a cross sectional view taken along line 3-3 of FIG. 2. FIG. 4 is a bottom plane view of the partition member of the fluid-filled vibration-damping device.

As shown in FIG. 1, the fluid-filled vibration-damping device includes: a first mounting member 1; an elastic body 2 bonded at one end to the first mounting member and having a recess 23 at the other end; a cylindrical second mounting member 3 bonded to the other end of the elastic body 2; a diaphragm 4 whose peripheral portion is supported by an inner circumferential surface of the second mounting member 3 so that the diaphragm 4 cooperates with the elastic body 2 to define therebetween a fluid chamber 45 filled with a fluid "L"; and a partition member 5 whose peripheral portion is supported by the inner circumferential surface of the second mounting member 3 so that the partition member 5 divides the fluid chamber 45 into a primary fluid chamber 46 and an auxiliary chamber 47. The partition member 5 includes: a metallic orifice-defining member 51 adapted to define an orifice passage 54 for fluid communication between the primary and auxiliary fluid chambers 46, 47; a movable rubber plate 53 disposed in a central hole formed through the orifice-defining member 51; and a coating rubber layer 53 provided onto a surface of the orifice-defining member 51.

The first mounting member 1 is made of ferrous metal or other rigid materials and includes: a shaft-form portion 11 having a tapped hole 11a for receiving a mounting bolt (not shown) screwed therein; and a ring-shaped flange portion 12 projecting radially outwardly from one end of the shaft-form portion 11.

The elastic body 2 takes the form of a one-end closed cylindrical member by vulcanizing a rubber material for forming the elastic body 2. More specifically, the elastic body 2 includes a body part 21 of generally truncated conical shape and a cylindrical part 22 axially extending from an outer circumferential portion of the large diameter end portion of the body part 21. The recess 23 is defined within the cylindrical part 22 of the elastic body 2 and open in one of opposite end faces (a lower end face as viewed in FIG. 1) of the elastic body 2. In this regard, the cylindrical part 22 consists of axially divided two segments since the second mounting member 3 consists of axially divided two segments. The small diameter end portion of the body part 21 of the elastic body 2 is bonded to an outer circumferential surface of the shaft-form portion 11 of the first mounting member 1, through the above-indicated vulcanization process, while being disposed in co-axial relation with the first mounting member 1.

The second mounting member 3 is a cylindrical member of ferrous metal or other rigid materials and consists of the two segments, i.e. a cylindrical mounting portion 31 and a tapered cylindrical portion 32, which are separated from each other in an axial direction of the second mounting member 3. The cylindrical mounting portion 31 includes a caulking part 31a formed at one of axially opposite end portions thereof (an lower end portion as viewed in FIG. 1), while the tapered cylindrical portion 32 includes a ring shaped mounting flange 32a formed at the other one of axially opposite end portions thereof (an upper end portion as viewed in FIG. 1). The caulking part 31a of the cylindrical mounting portion 31 is caulked against the mounting flange 32a of the tapered cylindrical portion 32 with a sideway U-letter shape in cross section for compressively gripping the mounting flange 32a by the calking part 31a. Thus, the cylindrical mounting portion 31 and the tapered cylindrical portion 32 are assembled together into an integral body. In this regards, a flange portion 51b of the orifice-defining member 51 is superposed on the mounting flange 32 and gripped by and between the caulking part 31a together with the mounting flange 32a.

The second mounting member 3 is bonded through the aforesaid vulcanization at its inner circumferential surface to the outer circumferential surface of the elastic body 2, while being disposed in co-axial relation with the elastic body 2. In detail, to an inner circumferential surface of the cylindrical mounting portion 31 of the second mounting member 3, bonded are an outer circumferential surface of the body part 21 of the elastic body 2 and an outer circumferential surface of one of the segments (the upper segment as seen in FIG. 1) of the cylindrical part 22 of the elastic body 2. To an inner circumferential surface of the tapered cylindrical portion 32 of the second mounting member 3, bonded is the other segment (the lower segment as seen in FIG. 1) of the cylindrical part 22 of the elastic body 2.

The diaphragm 4 is a rubber member of dome shape. A peripheral portion of the diaphragm 4 is bonded to a small diameter end portion of the tapered cylindrical portion 32 of the second mounting member 3 in the process of vulcanization of a rubber material for forming the dome shape diaphragm 4, so that the diaphragm 4 is supported by the tapered cylindrical portion 32. The diaphragm 4 is connected and integrally formed with the cylindrical part 22 of the elastic body 2 bonded to the inner circumferential surface of the tapered cylindrical portion 32. In this state, the diaphragm 4 and the recess 23 of the elastic body 2 cooperate to define therebetween the fluid chamber 45 with fluid tight sealing.

The fluid chamber 45 is filled with non-compressible fluid "L" such as water, alkylene glycols, silicone oils, or the like.

As is apparent from FIGS. 1-4, the partition member 5 includes the metallic orifice-defining member 51 of ring shape, the movable rubber plate 52 whose peripheral portion is bonded during vulcanization to the central hole of the orifice-defining member 51 and the coating rubber layer 53 secured onto the surface of the orifice-defining member 51. The partition member 5 is disposed within the fluid chamber 45 with an outer peripheral portion of its flange portion 51b supported by the calking part 31a of the second mounting member 3, together with the mounting flange 32a of the tapered cylindrical portion 32. In this state, the partition member 5 divides the fluid chamber 45 into the primary fluid chamber 46 on the side of the first mounting member 1 and the auxiliary fluid chamber 47 on the side of the diaphragm 4.

The orifice-defining member 51 of the partition member 5 includes a sidewall portion 51a of short cylindrical shape and the ring shaped flange portion 51b extending radially outwardly from one of axially opposite end portions (upper end portion as viewed in FIG. 1) of the sidewall portion 51a. The orifice-defining member 51 is formed as an integral member by pressing a ferrous metal plate. With the orifice-defining member 51 supported at its flange portion 51b by the caulking part 31a of the second mounting member 3, as described above, the tapered cylindrical portion 32 of the second mounting member 3 and the sidewall portion 51a of the orifice-defining member 51 cooperate to define therebetween the orifice passage 54 extending circumferentially substantially over an entire circumference of the orifice-defining member 51.

The flange portion 51b has a first port 54a circumferentially extending with an arc shape and located at a predetermined circumferential position corresponding to the beginning of the orifice passage 54, so that the orifice passage 54 is open to the primary fluid chamber through the first port 54a. On the other hand, the sidewall portion 51a has a second port 54b circumferentially extending and located at a predetermined circumferential position corresponding to the end of the orifice passage 54, so that the orifice passage 54 is open to the auxiliary fluid chamber through the second port 54b. For the above arrangement, the primary and auxiliary fluid chamber are held in fluid communication with each other through the orifice passage 54.

The movable rubber plate 52 is formed in a disk shape integrally with the orifice-defining member 51, by vulcanizing a rubber material for forming the movable rubber plate 52 within a mold cavity in which the orifice-defining member 51 is preset. The peripheral portion of the movable rubber plate 52 is bonded through the above-described vulcanization to the inner circumferential surface of the sidewall portion 51a of the orifice-defining member 51 so as to coat an entire area of the inner circumferential surface. That is, the central hole of the orifice-defining member 51 is fluid-tightly closed by the movable rubber plate 52. It should be appreciated that no surface area of the orifice-defining member 51 is directly exposed to the auxiliary fluid chamber 47 since the inner circumferential surface of the sidewall portion 51a is entirely coated by the movable rubber plate 52.

Similarly, the coating rubber layer 53 is formed integrally with the orifice-defining member 51 by vulcanizing a rubber material for forming the coating rubber layer 53 within the mold cavity in which the orifice-defining member 51 is preset. The coating rubber layer 53 is bonded through the above-described vulcanization to predetermined areas of the surface of the orifice-defining member 51, so that the orifice-defining member 51 is coated by the coating rubber layer 53 at a preliminary-fluid-chamber-defining area where the surface of the orifice-defining member 51 defines the primary fluid chamber 46 and an orifice-passage-defining area where the surface of the orifice defining member 51 defines the orifice passage 54. Described in detail, the coating rubber layer 53 is provided so as to cover substantially entirely an upper and lower surfaces of the flange portion 51, except the outer most peripheral portions thereof. The upper and lower surfaces of the flange portion 51 are respectively partially defining the primary fluid chamber 46 and the orifice passage 54. Also, the coating rubber layer 53 is provided so as to cover an outer circumferential surface of the sidewall portion 51a, which surface defines the orifice passage 54. Further, the surface of the first and second ports 54a, 54b are coated by the coating rubber layer 53, likewise. Yet further, the coating rubber layer 53 is integrally connected and formed with the movable rubber plate 52 at the same time when the movable rubber plate 52 is formed by the above-described vulcanization. Therefore, the surface of the orifice-defining member 51 is hardly exposed to the primary fluid chamber 46 and the orifice passage 54.

When vulcanizing the rubber material for molding the coating rubber layer 53, a mold is used in which a plurality of pressing pins are provided so that the flange portion 51b of the orifice-defining member 51 preset in a mold cavity is gripped and supported by and between the pressing pins held in contact with opposite surfaces of the flange portion 51b, for thereby preventing deformation of the orifice-defining member 51 relative to the mold cavity due to an pressure of the rubber material injected into the mold cavity. As a result, a plurality of pinholes 55 are formed in the molded coating rubber layer 53 at respective locations where the plurality of pressing pins are held in contact with the flange portion 51b of the orifice-defining member 51 thus preventing a provision of the coating rubber layer 53. The configuration of each pinhole 55 is approximately identical with that of the corresponding pressing pin.

The fluid-filled vibration-damping device constructed according to the present invention can be used as an engine mount for an automotive vehicle, and may be installed on the vehicle such that the first mounting member 1 is fixed to a mounting member on the side of an engine by means of a mounting bolt (not shown) threaded into the tapped hole 11a of the first mounting member 1, while the cylindrical mounting portion 31 of the second mounting member 3 is press-fitted into an fixing bore provided on the side of a body of the vehicle, for example.

The engine mount thus installed on the vehicle is able to effectively absorb high frequency vibrational loads exerted from the engine based on elastic deformation of the elastic body 2 and engine shakes or other low frequency vibrational loads based on resonance of the fluid L flowing through the orifice passage 54 due to a fluid pressure variation and a volumetric change excited in the primary fluid chamber 46 and the volume of the auxiliary fluid chamber 47.

During operation of the fluid-filled vibration-damping device of the present embodiment, the fluid L is forced to flow within the fluid chamber 45 based on the fluid-pressure difference between the primary and auxiliary fluid chambers 46, 47 as described above. Particularly, the fluid L is subjected to a relatively large pressure variation within the primary fluid chamber 46 and the orifice passage 54, thereby causing generation of a multiplicity of bubbles in the fluid L as a result of such a relatively large fluid pressure variation. In this regards, the presence of the coating rubber layer 53 coating the surface of the orifice-defining member 51 at respective areas defining the primary fluid chamber 46 and the orifice passage 54, prevents that an impact of bubble bursting is directly exerted on or applied to the orifice-defining member 51. The elasticity of the coating rubber layer 53 can absorb or minimize the impact of the bubble bursting exerted on the coating rubber layer 53, thereby eliminating or minimizing noises caused by the bubble bursting, and accordingly minimizing an amount of noises undesirably transmitted to the outside of the mount. Thus, it is possible to effectively avoid deterioration in silence and driving comfort of the vehicle.

According to the fluid-filled vibration damping device of the present embodiment, as described above, the surface of the orifice-defining member 51 is coated by the coating rubber layer 53 at the areas respectively defining the primary fluid chamber 46 and the orifice passage 54, making it possible to effectively minimize noises caused by the bubbles generated in the fluid L filling the fluid chamber 46.

A further advantage of the present embodiment is that the coating rubber layer 53 is formed by vulcanization integrally with the orifice-defining member 51 so that the coating rubber layer 53 is integrally formed and connected with the movable rubber plate 52. Therefore, the coating rubber layer 53 and the movable rubber plate 52 are formed on the surface of the orifice-defining member 51 with no gap formed therebetween. This arrangement makes it possible to surely prevent the surface of the orifice-defining member 51 from being exposed. Additionally, the coating rubber layer 53 is easy and cheep to manufacture.

Figure 5:
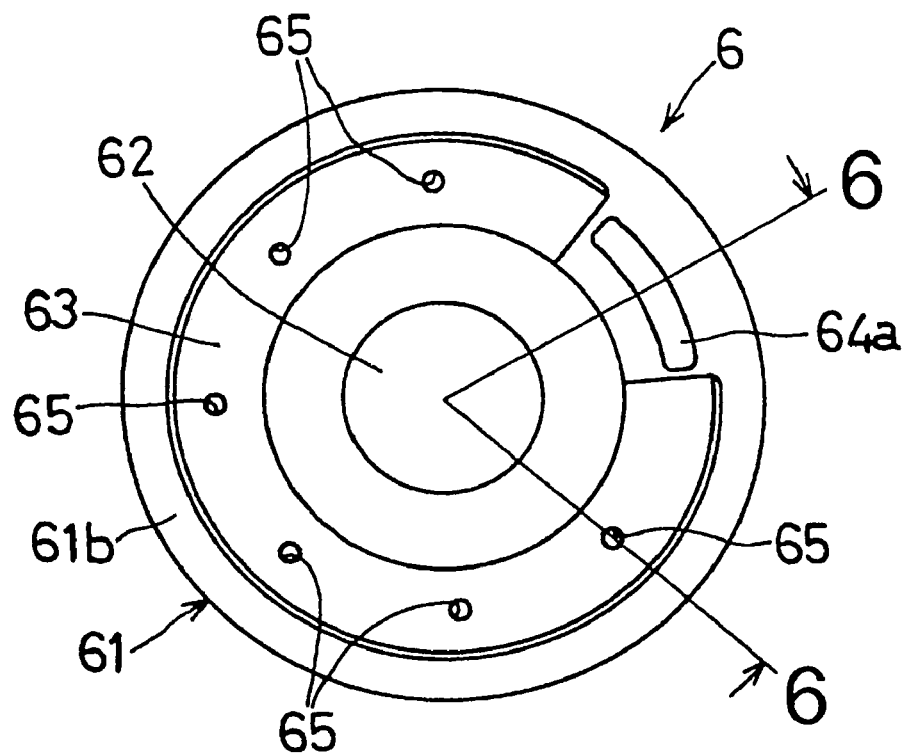
FIG. 5 is a top plane view of a partition member for use in a fluid-filled vibration-damping device according to a second preferred embodiment of the invention.
Figure 6:
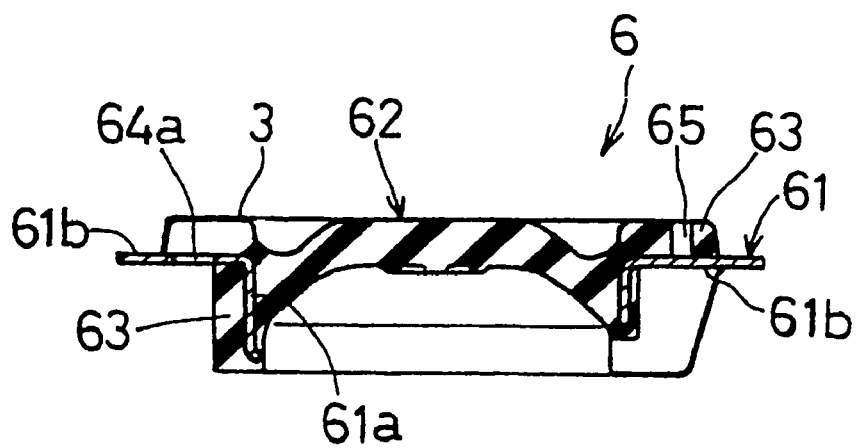
FIG. 6 is a cross sectional view taken along line 6-6 of FIG. 5.
Figure 7:
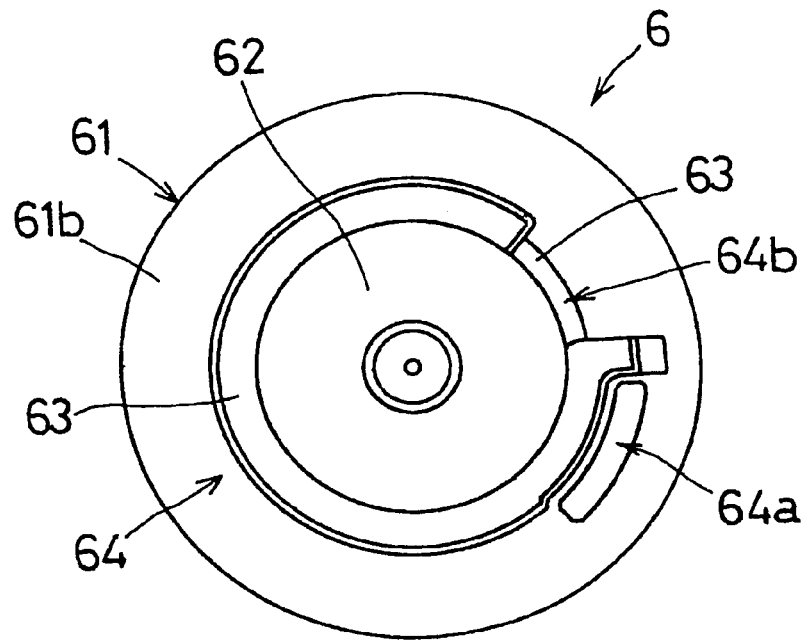
FIG. 7 is a bottom plane view of the partition member of the fluid-filled vibration-damping device according to the second preferred embodiment.
Figure 8:
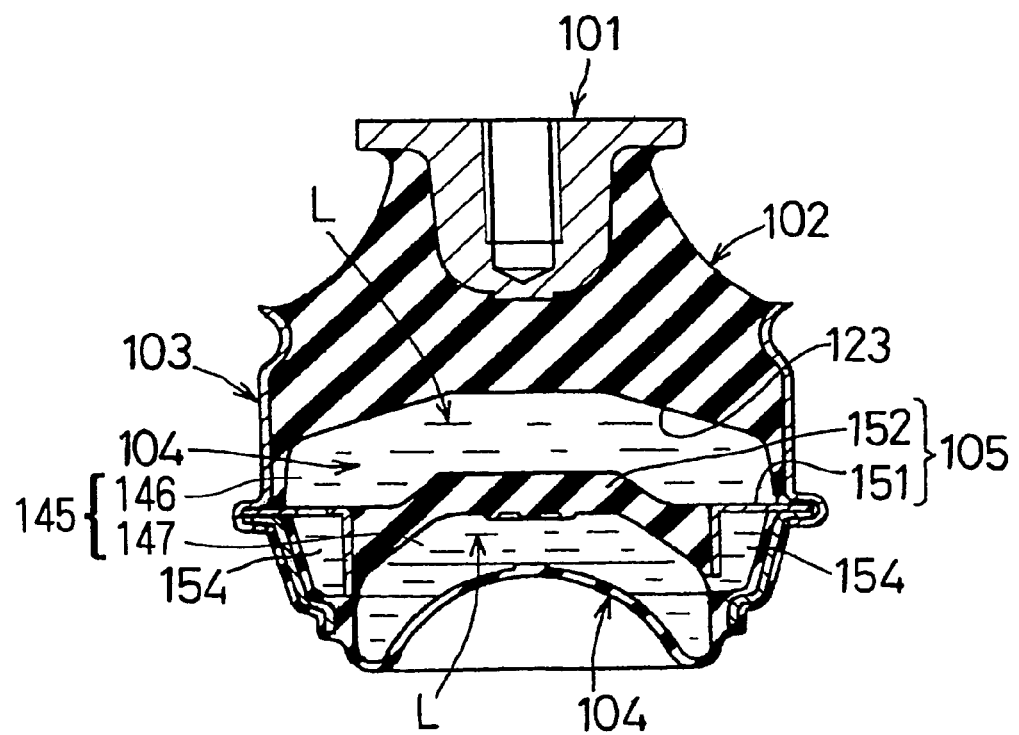
FIG. 8 is an elevational view in axial or vertical cross section of a conventional fluid-filled vibration-damping device.

There will be described a fluid-filled vibration damping device constructed according to a second embodiment of the invention. FIG. 5 is a plane view of a partition member used in the fluid-filled vibration-damping device of the second embodiment. FIG. 6 is a cross sectional view taken along line 6-6 of FIG. 5. FIG. 7 is a bottom plane view of the partition member.

According to the second embodiment, a partition member 6 includes an orifice-defining member 61, a movable rubber plate 62 and a coating rubber layer 63, like in the first embodiment. Only the location of the coating rubber layer 63 on the orifice-defining member 61 is made different from that in the first embodiment, but the orifice-defining member 61 and the movable rubber plate 62 are made similar to those in the first embodiment. According to the present embodiment, the coating rubber layer 63 is molded by using a mold further modified in an effort to prevent deformation of the flange portion 61b within the mold.

In the modified mold, the upper surface of the flange portion 61b (the surface on the side of the primary fluid chamber 46) is held in contact over a sufficient area with the mold at a portion where the first port 54a is formed so that the upper surface of the flange portion 61b is directly supported by the modified mold. As a result, shown in FIG. 5, the coating rubber layer 63 is not formed on the portion of the upper surface of the flange portion 61b (at around the first port 54a formed through the flange portion 61b) where the modified mold is directly contact with the flange portion 61b. Like in the first embodiment, a plurality of pinholes 65 are formed in the coating rubber layer 63 at respective locations where the plurality pressing pins are held in contact with the flange portion 61b.

On the other hand, the lower surface of the flange portion 61b (the surface on the side of the orifice passage 64) is held in contact at its outer peripheral portion directly with the mold over its entire circumference with a radial widthwise dimension of about two-thirds of the radial widthwise dimension of the flange portion 61b measured from the outer peripheral edge of the flange portion 61b. As a result, shown in FIG. 7, the coating rubber layer 63 is not formed on the portion where the modified mold is directly held in contact with the flange portion 61*b*. In other words, the coating rubber layer 63 is formed on the radially inner portion of the flange portion 61 so as to coat an entire area of the outer circumferential surface of the sidewall portion 61*a* (the surface on the side of the orifice passage 64), as well as the radially inner area of the lower surface of the flange portion 61*b* with a radial widthwise dimension of about one-third of the radial widthwise dimension of the flange portion 61*b*.

The said second embodiment as described above makes it easy to manufacture the coating rubber layer 63 while surely preventing the deformation of the orifice-defining member 61 relative to the mold when vulcanizing a rubber material for forming the coating rubber layer 63.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration-damping device for elastically connecting two members in a vibration damping fashion, comprising:
    a first mounting member fixable to one of the two members;
    an elastic body bonded at one of opposite end portions thereof to said first mounting member and having a recess open in an other one of opposite end portions thereof;
    a second mounting member of cylindrical configuration fixable to an other one of the two members and bonded on an outer circumferential surface of said other one of opposite end portions of said elastic body;
    a diaphragm whose peripheral portion is supported by an inner circumferential surface of said second mounting member so that said diaphragm cooperates with said elastic body to define therebetween a fluid chamber filled with a fluid;
    a partition member whose peripheral portion is supported by said inner circumferential surface of said second mounting member so that said partition member divides said fluid chamber into a primary fluid chamber and an auxiliary fluid chamber, said partition member including a metallic orifice-defining member adapted to at least partially define an orifice passage for fluid communication between said primary and auxiliary fluid chambers, and a movable rubber plate disposed in a central hole formed through said orifice-defining member; and
    a coating rubber layer formed on a surface of said orifice-defining member at a primary-fluid-chamber-defining area,
    wherein said primary-fluid-chamber-defining area is substantially entirely coated by said coating rubber layer.

2. A fluid-filled vibration-damping device according to claim 1, wherein said coating rubber layer is formed on said surface of said orifice-defining member at an orifice-passage-defining area as well as said primary-fluid-chamber defining area.

3. A fluid-filled vibration-damping device according to claim 2, wherein said coating rubber layer is integrally formed with said orifice-defining member through a vulcanization of a rubber material so that said coating rubber layer and said movable rubber plate are integrally connected and formed with each other.

4. A fluid-filled vibration-damping device according to claim 1, wherein said coating rubber layer is formed on said surface of said orifice defining member at an auxiliary-fluid-chamber-defining area in addition to said primary-fluid-chamber-defining area and said orifice-passage-defining area.

5. A fluid-filled vibration-damping device according to claim 1, wherein said coating rubber layer exhibits elasticity enough to minimize impact exerted thereon upon bursting of bubbles generated in said fluid.

6. A fluid-filled vibration-damping device according to claim 1, wherein said device is applied to an engine mount for use in an automotive vehicle, and said orifice passage is tuned so that said engine mount exhibits vibration damping effect with respect to low frequency vibrations based on resonance of said fluid flowing through said orifice passage, while said elastic body is elastically deformable so that said engine mount exhibits vibration damping effect with respect to high frequency vibrations based on elastic deformation of said elastic body.

* * * * *